United States Patent [19]

Schoeber et al.

[11] Patent Number: 5,136,980
[45] Date of Patent: Aug. 11, 1992

[54] ANIMAL CONFINEMENT SYSTEM

[76] Inventors: Herman Schoeber, 640-D West Chain of Rocks Rd., Granite City, Ill. 62040; Thomas D. Noble, R.R. #1, Box 185, Chapin, Ill. 62628

[21] Appl. No.: 655,090
[22] Filed: Feb. 14, 1991
[51] Int. Cl.⁵ .............................................. A01K 1/00
[52] U.S. Cl. ...................................... 119/16; 119/21; 119/28; 119/161; 160/40; 210/916
[58] Field of Search ...................... 119/16, 28, 21, 161; 160/40; 4/449, 459, 460; 210/916, 608; 405/60, 63; 52/2.22, 2.14, 2.11, 86, 83; 49/477

[56] References Cited

U.S. PATENT DOCUMENTS

| | | | |
|---|---|---|---|
| 1,379,725 | 5/1921 | Shodron | 119/16 |
| 1,747,362 | 2/1930 | Graveley | 52/86 |
| 2,185,532 | 1/1940 | Waterman et al. | 52/86 |
| 3,042,001 | 7/1962 | Dubie et al. | 119/21 |
| 3,113,924 | 10/1963 | Mendius, Jr. | 210/916 |
| 3,884,804 | 5/1975 | Robinson et al. | 210/916 |
| 3,942,479 | 3/1976 | Powers | 119/21 |
| 4,102,307 | 7/1978 | Cusick et al. | 119/16 |
| 4,255,907 | 3/1981 | Lightell | 52/2.12 |
| 4,255,908 | 3/1981 | Rosenberg | 52/2.12 |
| 4,428,278 | 1/1984 | Sutton, Jr. | 119/21 |

FOREIGN PATENT DOCUMENTS 0582787 12/1977 U.S.S.R. ........................ 119/28

Primary Examiner—Robert P. Swiatak
Assistant Examiner—Todd E. Manahan

[57] ABSTRACT

An animal confinement system includes a building structure comprising a foundation, a floor supported by the foundation, an arched roof and side walls supported by the foundation and having a plurality of segmented, assemblable rib beam members. The structure also has a plurality of purlin members fixedly attached to the beam members, insulating material between the purlin members, and a polymeric covering fixedly attached to an exterior surface of the arched roof. An inflatable curtain system includes a curtain box supported by the side walls of the animal confinement system. The curtain box contains an inflatable curtain wherein the curtain is comprised of integrally molded, individual air chambers capable of being independently inflated. An air blower inflates the curtain through flexible tubing connecting the blower to the curtain. A wind-powered ventilator is also supported within the arched roof.

10 Claims, 5 Drawing Sheets

ANIMAL CONFINEMENT SYSTEM

BACKGROUND OF THE INVENTION

1. Field of the Invention

The present invention is directed to a livestock confinement building and gas control system.

2. Description of the Prior Art

Buildings used in the field of animal husbandry and confinement require continuous ventilation and temperature control to help in maintaining the health of the animals. These buildings generally have pits below the floor level to receive and store livestock waste products until they are removed. In some instances, flush gutters or scraper gutters are used instead of pits, to remove the manure from the building. Typically, such prior art buildings used for animal/confinement are described in U.S. Pat. Nos. 4,706,607; 4,442,792; 4,292,927; 4,208,279; 4,123,992; 4,060,054; 3,815,548; 3,707,812; 3,677,229; 1,981,418 and 1,981,417.

One of the problems associated with animal confinement is the gas generated from the large amounts of manure. Proper ventilation must be maintained to insure a suitable environment for the livestock as the gasses created from the manure are not only a health hazard to the animals, but act as a deterrent to their growth. Additionally, most of the building materials presently used in livestock confinement structures succumb to these caustic by-products. Also, the humidity from respiration tends to reduce the lifespan of these buildings. Materials found to be unaffected under these conditions are concrete, some plastic and treated lumber. Moreover, failure to adequately ventilate the confinement structure may also lead to a potential fire in the structure due to the build-up of explosive gasses.

In the past, manure pit areas have been ventilated using electrical fans which pull the gasses from the pit and exhaust them into the atmosphere. These fans are expensive, costly to run for 24 hours a day and costly to maintain. The use of ventilation fans of this type are regarded as being only 70% effective but, most important, have the potential of effecting disaster in the event of a power outage or equipment failure as the gasses in the pit are poisonous and will kill all of the animals if not detected in time.

SUMMARY OF THE INVENTION

Objects therefore of the present invention are to provide an improved livestock confinement building, wherein deterioration of the structural and facade or barrier components thereof are essentially unaffected by animal waste gasses, liquids or solids; wherein the ventilation system thereof is essentially fail-safe; wherein closer control of atmosphereic composition and temperature is attained; and wherein the building is economical to construct and maintain.

BRIEF DESCRIPTION OF THE INVENTION

These and other objects hereinafter becoming evident have been attained in accordance with the present invention, which in its broad sense is defined as; a building structure comprising a foundation, a floor supported by the foundation, an arched roof and side walls supported by the foundation and having a plurality of segmented, assemblable rib beam members. The structure also having a plurality of purlin members fixedly attached to the beam members, insulating material between the purlin members, and a polymeric covering fixedly attached to an exterior surface of the arched roof. The structure further having a gas supression system, an inflatable curtain system, and a wind-powered ventilation system supported within the roof.

In other certain preferred embodiments, the superstructure of the building is of a concrete arch construction having treated lumber purlins, beadboard type insulation and a vinyl plastic type roofing material. The building of this invention is unaffected by the conditions of confinement, is stronger than a wood frame building (wind load and snow load), and is substantially fire and rodent proof. The arch design additionally provides excellent ventilation and heat retention properties required of confinement buildings.

According to another embodiment of the present invention, a porcine confinement building is provided with a slatted floor having a manure pit located underneath The improvement to the manure pit being a gas suppression system comprised of floating expanded polystyrene logs which pass manure and float on top of the waste forming a pit gas control system. The manure passes around the logs and remains beneath the logs, eventually being removed as the pit fills.

According to yet another embodiment of the present invention is a wind powered turbine exhaust fan or plurality thereof, being mounted on the peak of the roof and optionally connected to the pit by a duct system. Being that only a minimal amount of gasses remain, due to the gas suppression system, the wind turbin(s) adequately ventilate the confinement structure without the need of additional electrical fans.

According to another embodiment of the present invention is a thermostatically controlled curtain system used to regulate th temperature of the building. The curtain system is inflated using a blower and manifold dispensing system. The curtain includes a plurality of inflated air tubes expanded upright when inflated to hold in body heat and when deflated allows the cooler outside air to enter.

According to still another embodiment of the present invention is a building which may be constructed, shipped and assembled in a "kit" form. Most of the components included to the kit are easily assembled, such that skilled labor is not required to erect the building.

BRIEF DESCRIPTION OF THE DRAWINGS

These and other objects and features of the present invention will be further understood from the following description and drawings wherein.

DESCRIPTION OF THE PREFERRED EMBODIMENT

Figure 1:
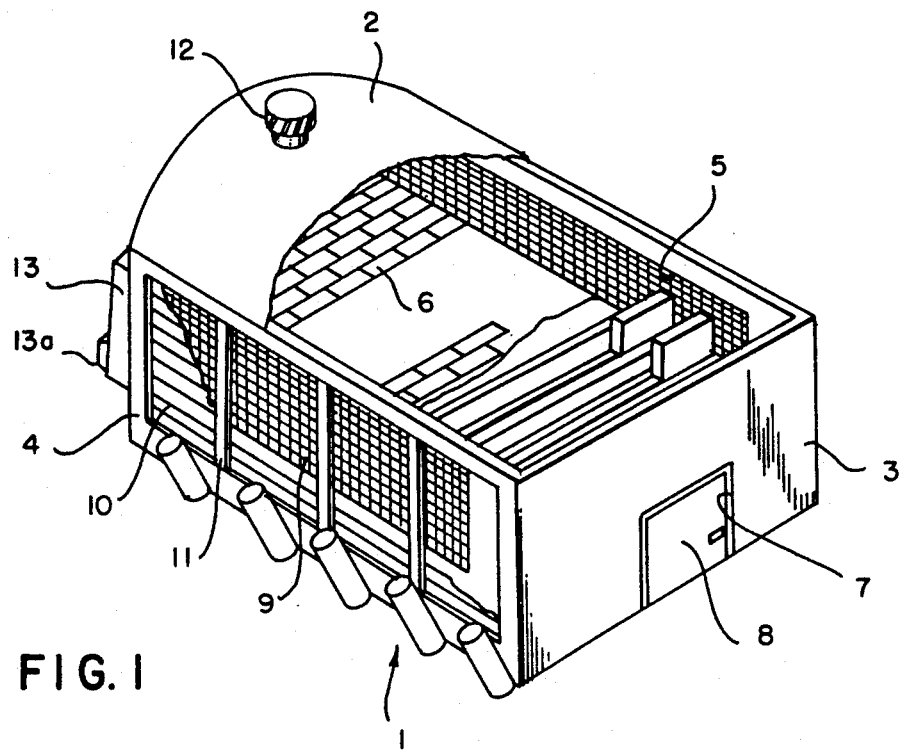
FIG. 1 is a perspective view of the preferred embodiment in accordance with the present invention.

Referring now to the drawings in which like reference characters designate like or corresponding parts throughout the drawings, FIG. 1 depicts a confinement building (1) having a roof (2), end walls (3), side walls (4) with openings (5) and a bottom area (6). Each end wall has a port (7) with a closure (8) Within each opening (5) has a birdscreen (9) and an inflatable curtain (10) exteriorly supported by poles (11). The birdscreen (9) provides interior support for the curtain. Mounted in the roof are a series of wind turbines (12) although only one is depicted in FIG. 1. At one end of the building is a blower box (13) and blower unit (13a). Referring now to FIG. 2a-2c, the building is substantially fortified by a plurality of arch beam members (14), each beam made of two leg support sections (16), two arched sections (17) and a center section (8'). Each section, (16 and 17), have ends (16a, 17a) to which are attached plates (16b, 17b) having holes (16c, 17c) for receiving bolts (16d). The plates (16b, 17b) include slits through which cement flows and adheres the plate to the end of the section. The bolts secure the sections end to end.

Referring back to FIG. 2, the building includes a foundation (30) constructed to mold a manure pit (32). A slatted floor (34) is provided so that waste products from the animals may pass into the manure pit (32). The slatted floor (34) defines a top (35) to the pit (32) and is supported at its periphery by the foundation (30).

The building in accordance with this invention may be constructed in a variety of configurations such as an elongate arch, an arched dome, which may be triangular, pentagonal, hexagonal, heptagonal, or octagonal. The following description and dimensions for construction of a building in accordance with the present invention are by example only and as will be obvious, may be adapted to fit any situation.

Figure 2:
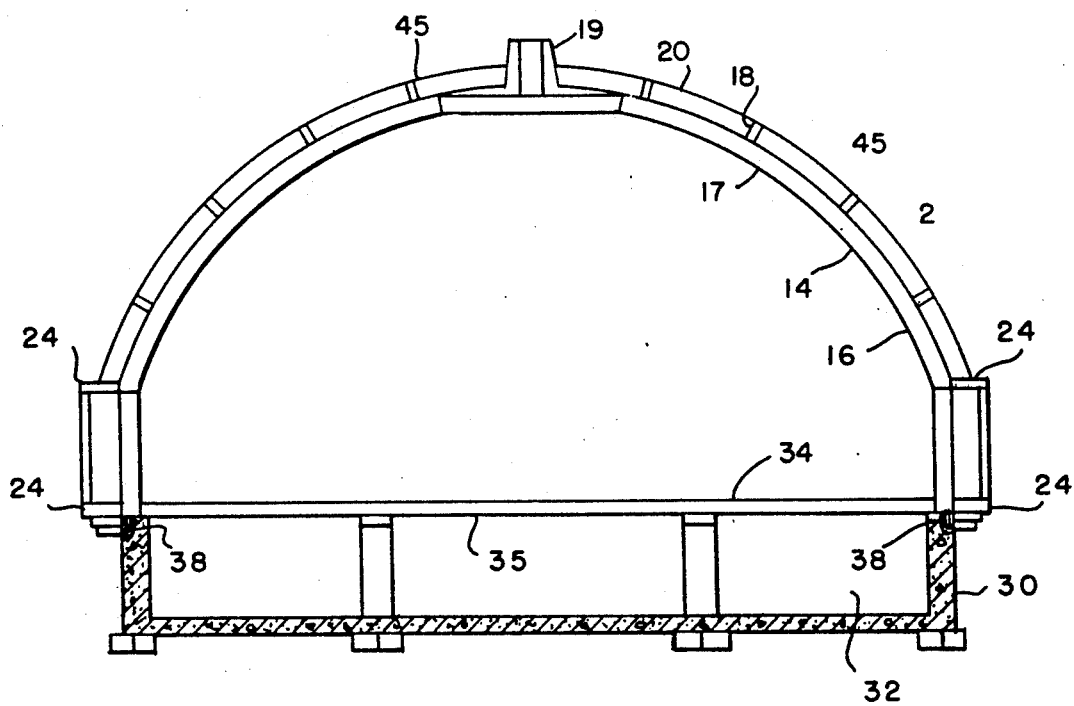
FIG. 2 is a cross-sectional end view of the type of building in accordance with the present invention.
Figure 2A:
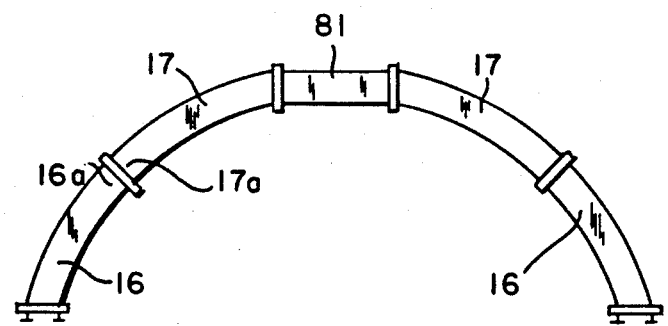
FIG. 2a is an end view of an arch beam member.
Figure 2B:
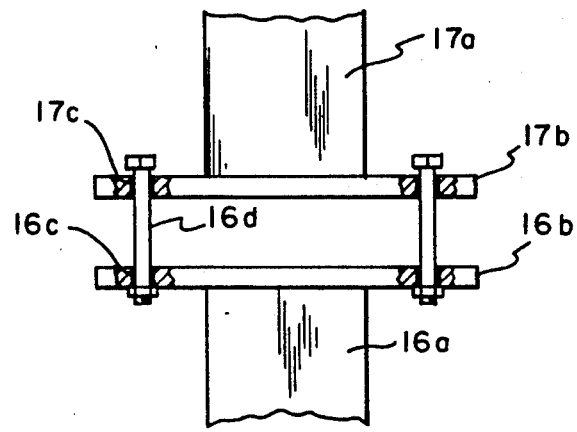
FIG. 2b is a close up view of the ends of a leg section and an arch section just prior to securement.
Figure 2C:
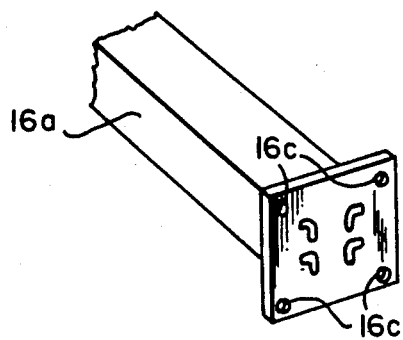
FIG. 2c is a perspective view of the ends of a leg section.
Figure 3:
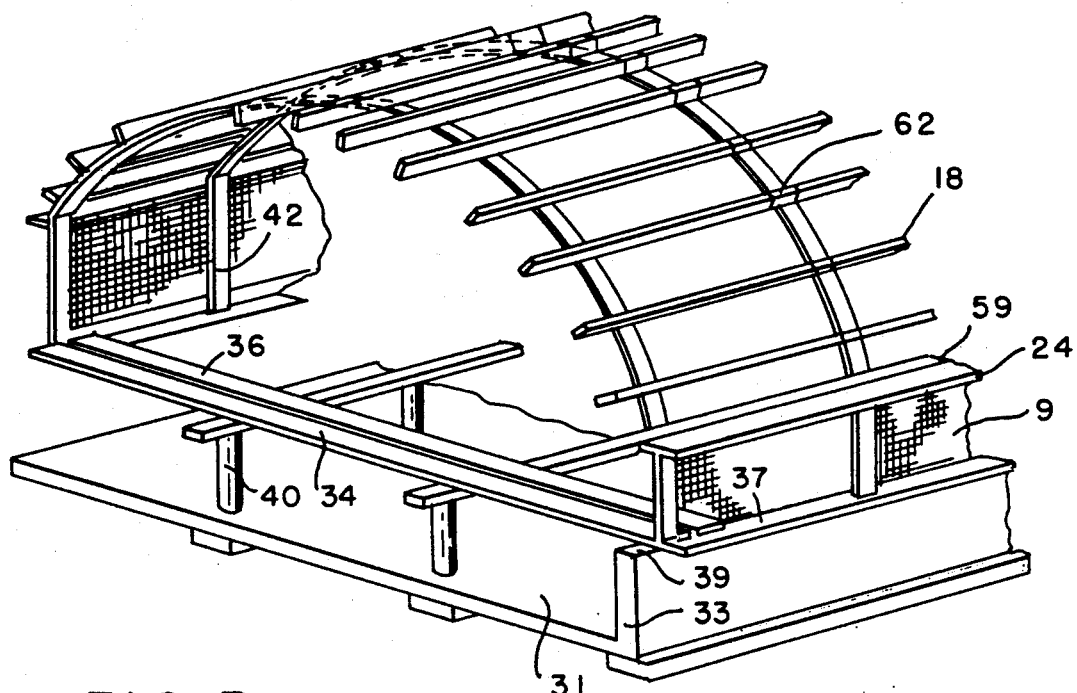
FIG. 3 is a perspective view of the confinement building during construction.

The foundation (30) as illustrated in FIGS. 2 and 3, include a foundation floor (31) and walls (33) which are formed using anchor bolts (38) poured into place. The bolts (38) are for securing the arched beam members (14) to the foundation and are located on approximately eight foot centers in each opposing foundation wall (33). The foundations walls (33) would be at least eight inches thick with the top portion of the walls serving as an inside ledge (37) for supporting the slatted floor (34). The outside four inches of the foundation wall (33) serves as an outside ledge (39) for supporting the arch beam members (14).

Affixed to the side walls are sheets of birdscreen (9). The birdscreen is attached by conventional means such as staples or nails. The birdscreen keeps out birds which are carriers of disease and are primary transmitters of sickness to animals.

The manure pit (32) is preferably four to eight feet deep depending on the amount of storage time needed for the manure. The foundation walls (33) are usually eight inches thick concrete consisting of a 5.5 bag mix throughout with ⅜ inch steel rebar (not shown) places two feet on center both vertically and horizontally. The foundation floor (31) is usually four inches thick with 8×16 inch footings poured first to support the floor. The foundation floor (31) may be reinforced by ten gauge 6×6 inch wire mesh (not shown).

The slatted floor (34) above the pit (32) is made of slats (36) which are pre-cast into 4×6 inch, eight foot long concrete, and are laid side by side with one inch spacing between for animals to walk on and waste to pass through to the pit below. The slats (36) are preferably concrete, but can be of plastic or steel for younger and smaller animals. The slats (36) are supported above the pit by 12×12 inch columns (40) placed eight feet on center and are the height of the pit (32). The manure stored in the pit is usually vacuumed from the pit periodically and hauled to farm ground where it is used as fertilizer for crops.

Concrete mixes for this invention include all types used for building, and may be adapted to the requirements and availability of resources in different geographical areas. The preferred concrete mix of the present invention is a basic 6.5 bag premix which contains ⅜ inch river rock. To every 170 pounds of that basic mix is added ¼ pound of nylon secondary concrete reinforcement, eight liters of water, and one ounce of water reducer. These amounts constitute one batch.

Three batches are mixed in an electric mixer at the casting site and hauled in five gallon pails to the forms. This amount will cast two sections of an arched rib beam.

After the arched rib beam members (14) are set in place curtain boxes (24) are constructed at the sides of the building. One component of the curtain box is a quarter angle (59), which is for example, 4 inches×4 inches×6 inches long. One quarter angle (59) is bolted to the leg sections and a second is bolted at the bottom of the leg on the outside.

The quarter angles (59) are in essence brackets which hold 2 ×12's that will form the curtain box (24). In each quarter angle (59) one hole (not shown) is drilled on one side for bolting the quarter angle (59) to the concrete leg (16) and four holes are drilled on the other side to attach to the 2×12's that will run the length of the building. Those holes are for ⅜ inch bolts. A single bolt may attach the quarter angle (59) to the concrete leg (16) by going all the way through the leg.

Figure 4:
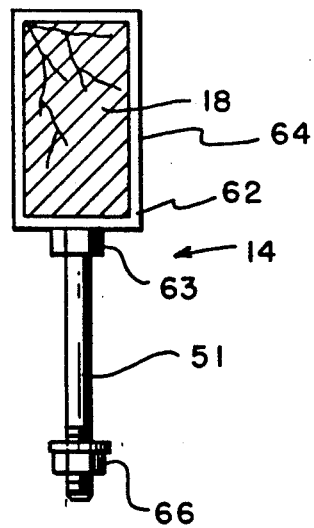
FIG. 4 is a cross-sectional view of a purlin holder.

Referring now to FIG. 4, once the rib beam members (14) are erected, treated wood roof purlins (18) may be secured to the beams by sliding purlin holders (62) onto the purlin board (18) first, then bolting the purlin holders (62) through bolt holes which have been poured in place on two foot centers in the beams.

The purlin holders (62) are lengths of steel tubing (64) which carry the purlins (18) on the outside of the beams' curve. These tubing components for this example, are two inches×four inches, ¼ inch thick, cut to six inch lengths.

A stainless steel bolt (63), is welded to the side of each length of tubing (64). From the outside of the beam (14) that bolt (63) goes through the bolt hole (51) formed at the time the concrete beam was poured. On the inside of the concrete beam a stainless steel nut (66) is affixed to the bolt.

Optionally, the roof purlins (18) may be run through the tubing (64) on each arched beam, from one arched beam to another, joining the rib beam arches (14) the entire length of the building or may be secured to the arches by the method previously discussed. A single nail is driven through each long side of each length of tubing into the purlin boards (18). The nails are driven through pre-drilled holes in the tubing, one hole on each long side face of the tubing, centered in from the end, and on alternate ends of the tube.

The purlin holder (62) and purlins (18) are attached at the bolt holes (51) that were previously formed, beginning approximately eight inches from the center of the roof and continuing approximately every two feet or so down to break point (42) in the leg section.

The insulation panels (20) are then placed between the roof purlins (18). The insulation panels may be beadboard blocks which are cut to fit between the purlins. Once the purlins are in place for the entire building, insulation is applied between each one of the roof purlins. The insulation is preferably of the formaldehyde bead type but may be of any suitable insulation material. For this example the insulation is applied in sheets four inches thick, 22 and ¼ inches wide, ×16 feet long.

For this example of an elongated arch, there are end walls (not shown) constructed at both ends of the building. The end walls may be a conventional stud wall construction with 2×4 studs on 24 inch centers running from the foundation wall to the bottom side of the arch. Walk-in doors may be, for example, framed in where needed. The end wall may also be insulated with beadboard insulation and the exterior surface covered with aluminum or vinyl siding. The interior surface of the end wall is preferably covered with a fiberglass wall covering.

While any suitable roofing material may be used for the outside covering of the building, the preferred building cover (45) is a thirty ounce per square yard ACRYLONITRILE BUTADIENE POLYMER BLEND (NPB). The (NBP) may be reinforced with a fabric which has outstanding strength and puncture resistance such as Fiberloc (registered trademark).

The tensile strength of this covering exceeds 7,500 PSI with puncture resistance in excess of 250 pounds. The sheets are tough enough to be mechanically attached and withstand wind uplift forces of hurricane strength without ballast.

Additionally, the covering is flexible enough to accommodate building expansion or contraction to minus 35 degrees Fahrenheit without cracking.

NBP is thermoplastic material which can be hot air welded and repaired over its entire lifetime and is relatively unaffected by ultraviolet sun rays. Biocide is built in which inhibits mildew, fungi and algae growth on the surface. The material is also a natural fire retardant, water tight up to pressures above 500 PSI and its light reflective color is an energy saver on a daily basis.

The thirty ounce vinyl fabric is cut to length, folded, and welded in a direct-flame rotary welder. Widths are five feet wide, and enough widths are cut to make the correct length.

Holes are punched in the lower edge of the vinyl fabric and ropes are attached through these holes (for on site manipulation of the roof). The ropes will be laid back across the width of the fabric and rolled up as the roofing is rolled.

For a small building, the building cover may be constructed off-site, in two complete halves, then rolled and carried to the site for application. For a large building, the cover is manufactured in sections-of-halves up to 100 to 115 feet.

The building cover (45) is attached from the center peak of the building down on one side and then down on the other side, thus the application of the covering is completed in halves.

A building cover (45) for half of a roof, or sections of the roof, if the building is large or configured other than as a elongated arch, is rolled to approximate the dimensions of the height of the roof (from bottom to top), than rolled again, across what will be the dimensions of the length of the roof, such that the roofing sections are a rolled roll. From this point they are easily transported to the construction site.

Applications begin at the ridge of the building by unrolling the building cover (45) out the length of the roof, from one end to the other. The building cover is then unrolled from the ridge down to the bottom of the roof curve.

Ropes are attached to the bottom roofing edges and are used to pull the slack out of the fabric and to help pull the cover tightly over the building.

Each half of the building cover is nailed, top and bottom, through two inch diameter washers (for protection of the fabric) on approximately eighteen inch centers.

The top is nailed to inside face of top purlin (70), at the side of the ridge vent (19), on the half of the building which is being roofed.

The bottom of the building cover (45) is nailed to the upper purlin, of the pair of wood purlins which secure the curtain box, with a one-inch spacer above the curtain box (24). The bottom of the roof cover (45) is then wrapped around the 2×12, thus protecting the 2×12 from water run-off as well as serving an aesthetic purpose.

The building cover (45), which is made just slightly longer than necessary, is trimmed at the ends of the building, nailed to each purlin around the arch, and finished with a piece of trim (not shown).

The top of the building may then be covered with a vinyl material. This is accomplished by rolling the material on a five foot wooden spool which is lifted to the top of the building and unrolled on the peak of the building. Half the building, from the top down, is done at one time, then the other half. The length of the material is limited to approximately 100 feet per piece due to its weight As an example, if the building is 26 feet 8 inches×200 feet, the top could be cut into four pieces approximately 20 feet×100 feet each. Once in place, the top is stretched and nailed in place at the very top of the building where the ridge vent opening is, and at the very bottom where it meets the top board of the curtain box.

Figure 5A:
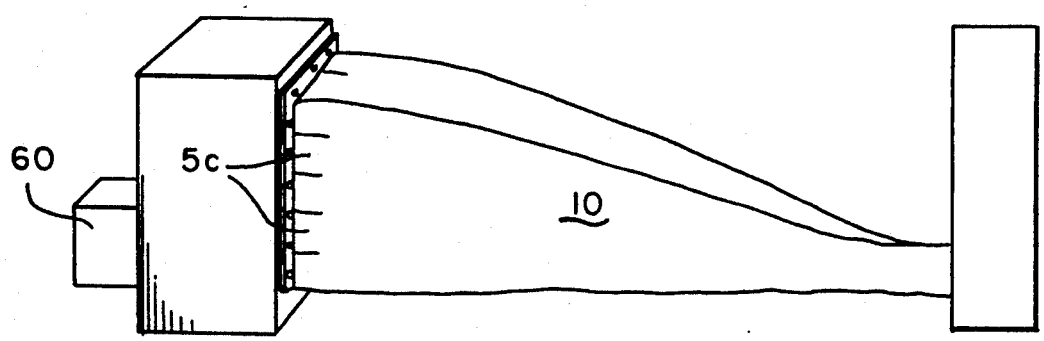
FIG. 5a is a perspective view of the inflatable curtain system.
Figure 5B:
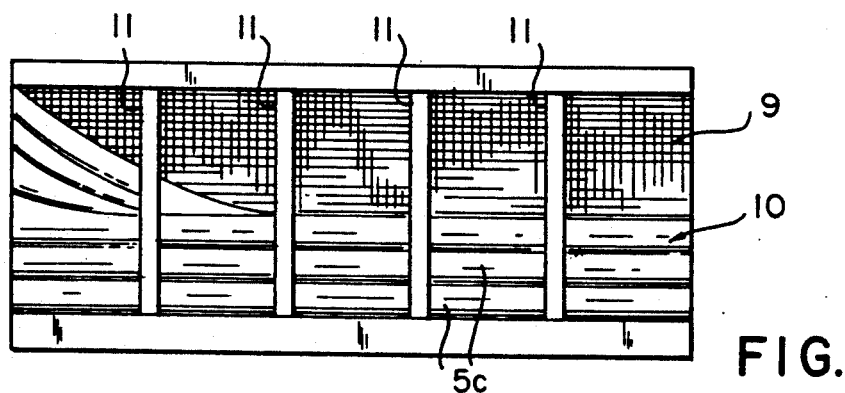
FIG. 5b is a side view of only the curtain supported in position.
Figure 5C:
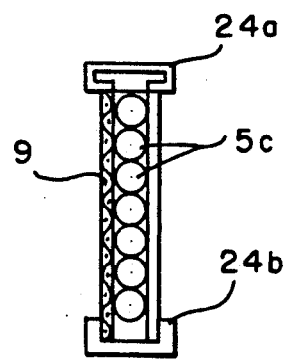
FIG. 5c is an end view of the curtain inflated.

Referring now to FIGS. 5a, 5b and 5c an inflatable thermostatic curtain is shown at (10) for covering opening (5) during cold weather months. Each curtain includes integral tube portions (5c) which receives air from a blower (60) that is thermally controlled by a thermostat. The tube portions (5c) constitute integrally molded, individual air chambers capable of being independently inflated. The thermostat, (such as Sunne, Model TF115) eliminates the need for any external switches. The curtain (10) is positioned adjacent the birdscreen (9) within troughs (24a, 24b).

In operation, the blower (60) is activated by the thermostat when the building calls for heat or higher temperature and runs the blower until a predetermined temperature is sensed inside the confinement area. The blower gradually inflates each tube causing the curtain to rise between the support poles (11) and the birdscreen (9). The curtain remains inflated until the blower is cut off.

When the thermostat deactivates the blower, the air in the curtain exhausts back through each tube causing the curtain to slowly drop until the thermostat restarts the cycle. Upper trough (24a) and lower trough (24b)

act as top and bottom supports for the curtain. The thermostat may be located anywhere inside the confinement area.

Figure 6:
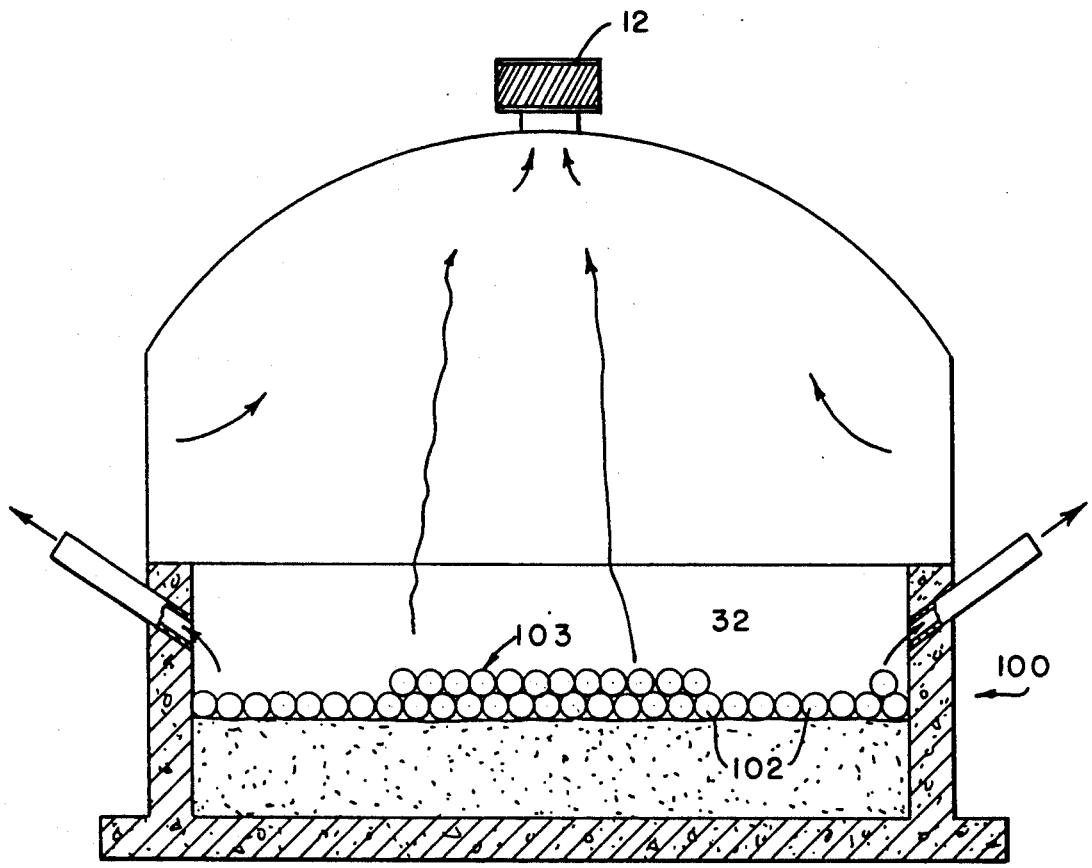
FIG. 6 is a cross-sectional view of the building's gas suppression system.

As shown in FIG. 6, a gas suppression system (100) for reducing the amount of gas formed in the manure pit (32) comprises a plurality of floating members (102) which may be made of expanded polystyrene and which float on top of the manure, sealing the gases in the pit.

The floating members (102) which may be of any geometric configuration which will allow the members to abut one another and effectively reduce gas formation from the manure pit. Preferably the floating members are cylindrical in shape and approximately three inches in diameter and two feet in length. The floating members form a flexible, solid permeable membrane (103) which allows manure to pass into the pit (by rolling of the floating members) and which effectively suppresses gas production from the manure.

One problem associated with manure pits is that gasses develop from the stored manure and may be injurious to the animal's health. In the past, the solution to this problem has been to mechanically ventilate the pit area with electric fans, pulling fresh air through the building which is built on the manure pit or through the pit area and thereby expelling the gasses. The biggest objection to this system is the possibility of power failure or equipment failure, that if gone undetected for any length of time, can be disastrous.

To supplement the gas suppression system (100) and cross breeze allowed by the curtain system, a wind turbine (105) or plurality thereof is mounted in the ridge vent (19) of the roof. The wind turbine (12) is as effective as a fan, without the need of, or reliance on, electricity. Once the turbine is started by the wind, it is kept spinning by the rising of the gasses which are lighter than air.

Because only a minimal amount of gasses are present due to the gas suppression system (100), the pit is effectively ventilated by the wind turbines (12). The wind turbines mounted on the peak of the roof may also be used to directly vent the pit (32) by connecting the intake of the turbines to the pit area with plastic tubes or ducts (not shown). The turbine (12) is only critical during the winter months when the building is closed tightly to conserve body heat. At that point, the air coming through the turbine is always warmer than the atmosphere and the turbine will spin from the warm air causing a "chimney effect."

The invention has been described in detail with particular reference to preferred embodiments thereof, but it will be understood that variations and modifications will be effected within the spirit and scope of the invention.

What is claimed is:

1. A building structure comprising:
   a) foundation means;
   b) floor means, supported by said foundation means;
   c) an arched roof and side walls supported by said foundation means and having;
      i) a plurality of segmented, assemblable rib beam members;
      ii) a plurality of purlin members fixedly attached to said beam memebers;
      iii) insulating menas between said purlin members;
      iv) polymeric covering means fixedly attached to an exterior surface of said arched roof;
   d) an inflatable curtain system supported by said side walls, wherein said inflatable curtain system includes a curtain box fixedly attached to said side walls, an inflatable curtain wherein said curtain is comprised of integrally molded, individual air chambers capable of being independently inflated; an air blower to inflate said curtain, said flexible tubing connecting said blower to said curtain; and
   e) wind-powered ventilator supported within said roof.

2. The building according to claim 1, wherein said rib beam members are comprised of reinforced concrete sections having brackets affixed to, or integrally molded with the end of each of said concrete sections.

3. The building according to claim 2, wherein each of said rib beam members is comprised of five reinforced concrete sections.

4. The building according to claim 3, wherein each of said rib beam members is comprised of:
   two leg sections, forming portions of opposing side walls;
   two arched sections, attached to said brackets to said leg sections at one end and to each other at the opposite end; and
   a center section attached between the two arched sections, and which substantially form said arched roof.

5. The building according to claim 1, wherein said wind powered ventilation means is a fan or a turbine.

6. An animal confinement building comprising:
   a) an arched roof having at least one wind-powered ventilation fan therein;
   b) side walls supporting said arched roof;
   c) a curtain box fixedly attached to said side walls;
   d) an inflatable curtain supported by said curtain box wherein said curtain is comprised of integrally molded, individual air chambers capable of being independently inflated;
   e) a pit for receiving and storing animal waste; and
   f) a gas suppression system wherein a plurality of floating members reduce gas formation in said pit.

7. The building according to claim 6, wherein said floating members are made of polystyrene.

8. The building according to claim 6, wherein said floating members are cylindrical in shape.

9. A building comprising:
   a) an arched roof having at least one wind-powered ventilation fan therein;
   b) side walls supporting said arched roof;
   c) a curtain box fixedly attached to said side walls; and
   d) an inflatable curtain having integrally molded individual air chambers which are capable of being independently inflated, and which curtain is supported by said curtain box.

10. An animal confinement building comprising:
   an inflatable curtain system having;
   a curtain box fixedly attached to said side walls;
   an inflatable curtain wherein said curtain is comprised of integrally molded, individual air chambers capable of being independently inflated;
   an air blower to inflate said curtain;
   flexible tubing connecting said blower and said curtain; and
   a thermostatic control for regulating the degree of inflation of said curtain.

* * * * *